Patented Mar. 3, 1931

1,794,370

UNITED STATES PATENT OFFICE

CHARLES N. FREY, OF NEW YORK, N. Y., ASSIGNOR, BY MESNE ASSIGNMENTS, TO STANDARD BRANDS INCORPORATED, OF DOVER, DELAWARE, A CORPORATION OF DELAWARE

HYDROLYZED PROTEIN PRODUCTS AND METHOD OF USING THE SAME

No Drawing.   Application filed September 26, 1928. Serial No. 308,586.

This invention relates to a method of preparing hydrolyzed protein products and to methods of using the same.

An object of the invention is to provide a composition which may be economically and easily prepared and which is adapted for use with good results in the manufacture of yeast and in bread-making.

A more specific object of the invention is to provide a composition of the type described, which will not deteriorate under commercial conditions of storage, and, which, when used in bread manufacture, improves the food value, and particularly the crust color or "bloom" of the loaf, to an extent such as to allow of the use of sugar substances, such as corn sugar, maltose and the like.

Other objects of the invention will in part be obvious and will in part appear hereinafter.

The invention accordingly comprises the several steps and relation and order of one or more of such steps with respect to each of the others thereof, which will be exemplified in the process hereinafter disclosed, and the scope of the application of which will be indicated in the claims.

The present invention comprises an improvement over the heretofore known methods of preparing acid-hydrolyzed protein substances, particularly in that after the hydrolysis a portion of the free acid is neutralized with an alkaline, nitrogen-containing substance, such as aqua-ammonia, whereby the resultant product has exceptionally desirable properties with respect to its suitability as a nitrogen source in yeast manufacture and with respect to its "bloom"-producing characteristics in the manufacture of bread.

As a specific example of the manner in which the invention can be carried out the following is given: For each pound of protein-containing substance, such as compressed yeast, approximately 3 to 5 pounds of water is used, and sufficient acid, such as hydrochloric or sulphuric acid, is added to bring the concentration up to about 1.5% to 5%. This mixture is then cooked (in an autoclave at a pressure of about 20 pounds) for approximately four or five hours, whereupon the residue is separated from the extract by filtration or other suitable means, a portion of the yeast or crackling solution is neutralized with lime or soda, and the remainder thereof, depending upon the amount of nitrogen desired in the final product, is neutralized with ammonia.

When sulphuric acid is used as the hydrolyzing agent, a portion thereof can be conveniently thrown out by the addition of lime, which, as is well known, results in the formation of calcium sulphate. It has been found that from one-third to one-half of the acid used may be neutralized with ammonia with good effect. The resulting product is then evaporated, and may be used in a moist condition or evaporated to dryness.

Although the amount of the present product necessary to be used in bread-making will vary somewhat with the flour and the amount of sugar used, nevertheless, it has been found that when using $3\frac{1}{2}\%$ of sugar, such as maltose, from 0.3% to about 0.5% of the dry product gives substantially the same crust color as is obtained when an equivalent amount of cane sugar is used. In addition the action of the yeast is greatly stimulated and a more rapid fermentation is obtained.

Although yeast has been mentioned above as a specific protein-containing substance, nevertheless, it will be understood that other proteins, such as animal proteins, found in lard cracklings and casein, can also be used.

Having described my invention, what I claim as new and desire to secure by Letters Patent is:

1. A method of making hydrolyzed protein substances high in assimilable nitrogen, which comprises hydrolyzing a protein-containing substance with acid in the presence of heat and subsequently neutralizing a portion of the free acid with a basic substance containing nitrogen.

2. A method of making hydrolyzed protein substances high in assimilable nitrogen, which comprises hydrolyzing a protein-containing substance with acid in the presence of heat and subsequently neutralizing a portion of the free acid with a basic substance containing ammoniacal nitrogen.

3. A method of making hydrolyzed protein substances high in assimilable nitrogen, which comprises hydrolyzing compressed yeast with sulphuric acid, neutralizing a portion of the sulphuric acid with lime, separating the precipitate, and neutralizing a further portion of the acid with aqua-ammonia.

4. A method of making hydrolyzed protein substances high in assimilable nitrogen, which comprises hydrolyzing compressed yeast with an equal portion of 1½% to 5% sulphuric acid, neutralizing from one-half to two-thirds of the sulphuric acid with lime, separating the precipitate, and neutralizing a further portion of the acid with aqua-ammonia.

5. A process of manufacturing leavened bread, which comprises mixing with the flour, yeast and other dough ingredients, a small quantity of an acid-hydrolyzed protein which has been partly neutralized with a basic substance containing ammoniacal nitrogen.

6. A process of manufacturing leavened bread, which comprises mixing with the flour, yeast and other dough ingredients, a small quantity of an acid-hydrolyzed compressed yeast which has been partly neutralized with aqua-ammonia.

7. A method of making hydrolyzed protein substances high in assimilable nitrogen, which comprises hydrolyzing a protein-containing substance with sulphuric acid, neutralizing a portion of the sulphuric acid with lime, separating the precipitate, and neutralizing a further portion of the acid with aqua-ammonia.

8. A process of making hydrolyzed protein substances high in assimilable nitrogen, which comprises hydrolyzing a protein-containing substance with sulphuric acid, neutralizing a portion of the sulphuric acid with lime and another portion with aqua-ammonia, and separating the precipitate formed by the first-mentioned neutralization.

9. A process of manufacturing leavened bread, which comprises mixing with the flour, yeast and other dough ingredients a small quantity of a sulphuric acid-hydrolyzed-protein substance which has been partially neutralized with lime, the precipitate removed, and a further portion of the acid neutralized with aqua-ammonia.

In testimony whereof I affix my signature.

CHARLES N. FREY.